Oct. 5, 1943. G. W. JERNSTEDT ET AL 2,331,196
PROTECTIVE PHOSPHATE COATING
Filed Aug. 22, 1941
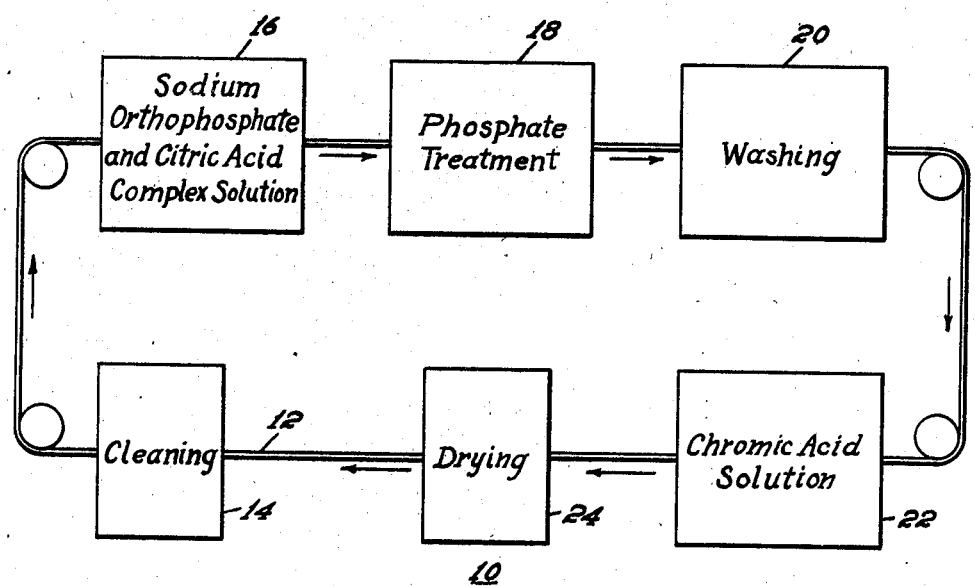
WITNESSES:
INVENTORS
George W. Jernstedt &
John C. Lum.
BY
ATTORNEY Patented Oct. 5, 1943

2,331,196

UNITED STATES PATENT OFFICE 2,331,196

PROTECTIVE PHOSPHATE COATING

George W. Jernstedt, Bloomfield, and John C. Lum, Union, N. J., assignors to Westinghouse Electric & Manufacturing Company, East Pittsburgh, Pa., a corporation of Pennsylvania Application August 22, 1941, Serial No. 407,886

7 Claims. (Cl. 148—6)

This invention relates to the art of producing corrosion-resistant phosphate coatings on the surfaces of iron, zinc and other metals and alloys. Such coatings are of primary importance in the preparation of the metal surface for subsequent application of organic finishes.

The object of this invention is to provide a composition suitable for treating metal surfaces to produce protective phosphate films.

Another object of the invention is to provide for an activating treatment for metallic surfaces to expedite the subsequent production of protective phosphate coatings thereon.

Other objects of the invention will, in part, be obvious, and will, in part, appear hereinafter.

For a fuller understanding of the nature and objects of the invention, reference may be had to the following detailed description, taken in conjunction with the accompanying drawing, in which the single figure is a diagrammatic view of a process for accomplishing the invention.

It is a common practice to treat metallic surfaces with compositions which, under appropriate conditions, will form on the metal surface a tenaciously adherent coating or film having corrosion protective characteristics to which organic finishes may be applied. These coatings are customarily produced by subjecting the metal surface to a solution containing phosphates and phosphoric acid which will deposit upon the metal surface a protective phosphate coating. Under microscopic examination, these coatings are revealed as consisting of numerous crystalline particles having numerous crevices whereby organic finishes are keyed firmly to the metal. The phosphate coatings also inhibit the spread of corrosion beneath the organic finish. Superior protection is thus furnished the metal by the organic finish when such protective phosphate coatings are interposed between the organic finish and the metal.

Originally, the production of the phosphate coatings on metal surfaces required prolonged contact between the metal and the phosphate solution, the time for such treatment requiring one or more hours. More recently, by suitable modification of the characteristics of the phosphate solution, coatings have been produced in a fraction of an hour, for example, ten to fifteen minutes.

It has been discovered that the time necessary for a reaction between the metal surface and the phosphate solution to produce satisfactory coatings may be further reduced and need not take longer than one or two minutes, providing the metal surface has been preconditioned for rapid reaction. The condition of the metal surface appears to be determinative of the ease and rapidity of the reaction between the metal and the phosphate coating solution. The surface should be clean and free from foreign substances which would interfere with the chemical reaction of the metal and phosphate and the surface should be in an activated condition. Under certain conditions, as will be herein disclosed, metal surfaces may be activated by means of a preliminary application of an activating medium whereby the metallic surfaces will react with great rapidity and remarkable uniformity with protective phosphate solutions to produce coatings of the highest protective value in a very short period of time. Furthermore, metals which were heretofore deemed unsuitable for satisfactory phosphate treatment to produce protective coatings of the type described, when preactivated, will likewise acquire these protective coatings.

In the copending patent application of George W. Jernstedt, Serial No. 411,141, filed September 17, 1941, and assigned to the assignee of the present application, there is disclosed a process whereby metal surfaces are activated prior to treatment with solutions capable of producing phosphate coatings on the metal. The activating solution there disclosed consisted of 0.1% to 2% of a dialkali phosphate solution containing from 0.001% to 0.01% of ferric iron. The dialkali phosphate solution containing ferric iron, when applied to metallic surfaces, imparted thereto such characteristics that the metal surface would acquire optimum protective coatings in subsequently applied phosphate coating solutions in one minute of time or less. Furthermore, the protective phosphate coatings deposited were greatly superior to those which were produced by the prior art without preactivation.

It has been found that the dialkali phosphate preactivating solution disclosed in the above referred to application had a short life, that is, the solution could be applied to a rather limited number of members, and thereafter deteriorated so rapidly that its effectiveness was uncertain. Furthermore, upon standing exposed to the atmosphere, the solution tended to deteriorate and lost its potency rapidly. Accordingly, it was necessary to constantly replenish or replace the dialkali phosphate solution at frequent intervals. This did not lend to satisfactory commercial practice. In addition, the cost of the material, due to its frequent replacement, was an undesirable feature.

It has been discovered that the life of the dialkali phosphate activating solution may be greatly prolonged with uniform results obtained throughout the life of the solution by preparing and using a complex reaction product of a dialkali phosphate and a hydroxy organic acid. Such complex reaction product will last for many days of continuous use and the results throughout the active life of the material will be substantially uniform. Furthermore, it is believed that the coatings produced with the modified type of activating solution are somewhat superior to those produced by the process employing dialkali phosphate alone.

In preparing the complex reaction product, any one of several hydroxy organic acids may be employed. Citric acid has been found to produce highly satisfactory results, and owing to its low cost and read availability may be preferred. However, other hydroxy acids of this type such as tartaric acid and salicylic acid have been used with successful results. It is believed that hydroxy organic acids have characteristics that render them suitable for forming a complex reaction product useful for this invention.

The complex reaction product is prepared most conveniently by the following process. One and three-quarters pounds of citric acid is dissolved in two gallons of a solvent such as ethyl alcohol and nine pounds of dialkali phosphate such as disodium phosphate containing from 0.1% to 1% of ferric iron suitable for activating metal surfaces is added to the solution. A curdy white precipitate is formed almost immediately. The precipitate is filtered out and the alcohol may be re-used. From one to ten parts of the hydroxy organic acid for each twenty parts of the disodium phosphate have been found to produce the best results, though equal parts of both have been successfully combined. The reaction does not appear to consist in a neutralization of the basic phosphate, but a complex compound having one molecule of citric acid, for example, to each 25 to 100 molecules of ortho-phosphate is produced.

The complex reaction product of dialkali phosphate and hydroxy organic acid is dissolved in water substantially free from calcium, magnesium or other alkaline earth metals to form an aqueous solution containing from ½% to 5% of the compound. The solution is substantially clear and is immediately available for application to metal surfaces to produce the activated condition thereon.

Referring to the single figure of the drawing, there is shown a typical schematic process 10 suitable for treating metal parts by means of the process disclosed herein. An endless conveyor 12 designed to convey parts to the various phases of the process is a form of apparatus suitable for production line work. However, other types of conveying apparatus may be employed in lieu thereof. Metal parts to be treated of iron, zinc or similar metals may be suspended from the conveyor prior to its entrance into the cleaning tank 14. The metal parts should be thoroughly freed from grease and any foreign matter on the surface. A trichlorethylene vapor type degreasing apparatus is suitable for this purpose. However, other types of apparatus for this purpose are well known to the art and need not be detailed herein. After cleansing, the suspended metal members are carried by the conveyor 12 to the apparatus 16 wherein a solution of dialkali ortho-phosphate and citric acid complex is applied thereto. The solution of the complex may be sprayed on the metal members or the members may be immersed within a body of the solution. Generally 45 seconds is ample for the activating treatment in the apparatus 16. The reaction at this stage of the process does not appear to produce any noticeable protective film on the metal surface. The solution simply activates the metal surface. After activation, the metal members are carried by the conveyor 12 to the phosphate solution at 18. A suitable composition for the solution at 18 is as follows:

| | | |
|---|---|---|
| Manganese phosphate | pound | 1¾ |
| Phosphoric acid (83%) | do | 5 |
| Sodium nitrate | do | ½ |
| Cupric nitrate | ounce | ¼ |
| Water to make 1 gallon. | | |

In preparing the phosphate coating solution, it is generally desirable to include a small portion of a water soluble salt of the metals manganese, copper or zinc. The copper nitrate in the above formula has been added for this reason and better results are obtained thereby.

In some cases, an aqueous solution capable of producing phosphate coatings on zinc may be prepared from zinc phosphate and iron phosphate with a small proportion of free phosphoric acid. This solution will give good results when applied to zinc surfaces which have been preactivated.

The concentrated solution of the ingredients listed is diluted to form a solution having a concentration of from 2% to 4% of the concentrate above prepared. The phosphate solution so prepared may be applied to the preactivated metal surfaces by spraying, dipping or any other suitable mode of conveying a liquid to a surface. It will react exceedingly rapidly with the preactivated metal surface. The metal surface will give off a large quantity of bubbles of gas. It is believed that these bubbles consist mainly of hydrogen gas. The oxidizing agent in the composition will oxidize and remove the bubbles which tend to adhere to the metal surface and thus prevent their interference with the production of a satisfactory coating. The metal surface will rapidly acquire a thin and exceedingly fine crystalline coating of protective metallic phosphates in the solution 18. The coating is believed to be substantially complete at the termination of gas bubbling from the metal surface. A few seconds farther immersion is not harmful and it may even be beneficial in some cases. Generally, the process is complete in a minute of time or less. Thereafter the coated metal may be washed at 20 to remove any excess phosphate solution, though the washing may be dispensed with, if thereafter the phosphate coated metal is immersed within a chromic acid solution at 22.

It has been discovered that the phosphate coatings give best results when they are subjected to a sealing treatment in chromic acid. The solution of chromic acid is generally a concentration of about 7½ ounces of chromic oxide per 100 gallons of solution. Only a fraction of a minute in the solution 22 is necessary to produce the sealing action.

In certain cases it has been found that by heating the chromic acid solution to a temperature of above 190° F. the sealing process will be expedited and subsequent drying will be more rapid. The heat imparted to the metal by the hot chromic acid solution will assist in a rapid drying of the surface of the metal so that organic finishes may be applied without long waiting for the metal surface to dry naturally or subjecting the surface to a subsequent drying operation. At 24 there is disclosed a drying oven which may be necessary for removing the moisture from the metal surface in cases where the chromic acid is not heated. Metal members may be removed from the conveyor 12 at the end of this cycle and thereafter subjected to additional treatment such as the application of protective organic finishes.

The protective phosphate coating produced by the process depicted at 10 has superior protective characteristics such, for example, that steel members coated therewith will not rust even after prolonged period of exposure to the atmosphere. However, the coatings are rather thin and not resistant to scratching and other physical abuse whereby the underlying metal is exposed to progressive atmospheric influences. It is accordingly preferable to apply a coating of lacquer, paint, enamel or other organic finish to the crystalline phosphate coating on the metal in order to achieve the highest corrosion resistance.

The phosphate coating produced on metal surfaces by the combination treatment disclosed in this invention is a decided improvement to that of the prior art. Coatings produced by the prior art practice without a preactivating surface treatment deteriorated rapidly and it was mandatory that an organic finish be applied promptly. The coatings produced by the present invention, however, are of much greater corrosion resistance and the uniformly deposited protective coating will not corrode or rust in areas in a short period of time as was the result with prior art practice. For example, zinc-plated steel members under a test corroded to a uniform white in twelve hours in the steam chest kept at 140° F. The same type of zinc-plated member provided with a phosphate coating without a preactivating treatment also showed white spots on a good portion of the surface in twelve hours under the same conditions. Zinc-plated members subjected to an activating treatment prior to application of a phosphate coating withstood fourteen days of steam at 140° F. before showing any sign of corrosion. This feature is highly advantageous since parts may be stored prior to use with the present invention treatment.

The complex of hydroxy organic acid and the dialkali phosphate assures an activating solution which will last for practical lengths of time and will give optimum results throughout this period. Its preparation is economical and rapid, the effects of the complex in the aqueous solution suitable for activating processes are somewhat superior to those indicated in the prior patent application of G. W. Jernstedt previously referred to. For example, the activating solution including only dialkali phosphate, has a variable and unpredictable hydrogen ion concentration ranging from 7.5 to 9. Such variations in acidity condition in the solution will result in different degrees of activation and somewhat non-uniform results. On the other hand, the citric acid-disodium phosphate complex has a substantially invariable pH of 6.8. This hydrogen ion concentration does not vary appreciably until the solution has been substantially used up. Such solution is particularly desirable in treating zinc surfaces. Ordinary disodium phosphate, when in aqueous solution having a pH of about 9, will attack zinc metal. Prolonged immersion in disodium phosphate solution accordingly is not beneficial to zinc.

In preparing the activated solution, the metals magnesium, calcium and other alkaline earth metals, should be absent or in a quantity below 0.001%, inasmuch as they appear to interfere with the activating reaction.

Since certain obvious changes may be made in the above procedure and different embodiments of the invention could be made without departing from the scope thereof, it is intended that all matter contained in the above description shall be interpreted as illustrative and not in a limiting sense.

We claim as our invention:

1. A metal treating material comprising, in combination, a dialkali phosphate, ferric iron and an organic hydroxy acid reacted to form a complex, the complex containing from 0.1% to 1% of ferric iron based on the dialkali phosphate content.

2. The reaction product of disodium phosphate, ferric iron and citric acid, the product having a pH of substantially 6.8 when dissolved in water to form a 1% solution for treating metal surfaces, the reaction product including from 0.1 to 1% ferric iron based on the disodium phosphate.

3. The complex produced by reacting one part of citric acid with from one to twenty parts of disodium phosphate and ferric iron in an amount ranging from 0.1% to 1% of the amount of the disodium phosphate.

4. An aqueous solution for application to metallic surfaces to activate the surfaces to provide for subsequent rapid formation of uniform, fine crystalline coatings of phosphates when the surfaces are subjected to phosphate solutions, which comprises the reaction product of from one to ten parts of disodium phosphate and one part of citric acid, the solution containing ¼% to 5% of the reaction product and from 0.01% to 0.001% of ferric iron, the solution being characterized by a substantially uniform hydrogen ion concentration.

5. The method of treating the surface of metals to provide for a corrosion resistant coating which comprises, in combination, applying to the metal surface a ¼% to 5% aqueous solution of the complex reaction product of from one to ten parts of a dialkali phosphate and one part of a hydroxy organic acid, the solution containing small but effective quantities of ferric iron in the range of 0.01% to 0.001%, to provide for activating the surface, and subsequently applying to the activated metal surface an aqueous solution containing iron phosphate, an oxidizing agent, free phosphoric acid and one or more metallic salts selected from the group of metals consisting of zinc, copper and manganese, to produce a fine crystalline phosphate coating on the metal surface.

6. The method of treating the surface of zinc metal to provide for corrosion resistance which comprises, in combination, applying to the zinc surface a ¼% to 5% aqueous solution of the complex reaction product of from one to ten parts of disodium phosphate and one part of citric acid, the solution containing 0.01% or less of ferric iron to activate the surface, and subsequently applying to the activated surface a solution containing zinc, iron, phosphate, free phosphoric acid and an oxidizing agent to produce a fine crystalline phosphate coating capable of retaining organic finishes.

7. The process of preparing a complex for use in activating metal surfaces for subsequent rapid formation of protective coatings on metal surfaces, which comprises adding one part of a hydroxy organic acid to one to ten parts of a dialkali phosphate containing ferric iron in a solvent for the hydroxy organic acid to produce a precipitate and separating the precipitate from the solvent.

JOHN C. LUM.
GEORGE W. JERNSTEDT.